United States Patent Office
3,437,187
Patented Apr. 8, 1969

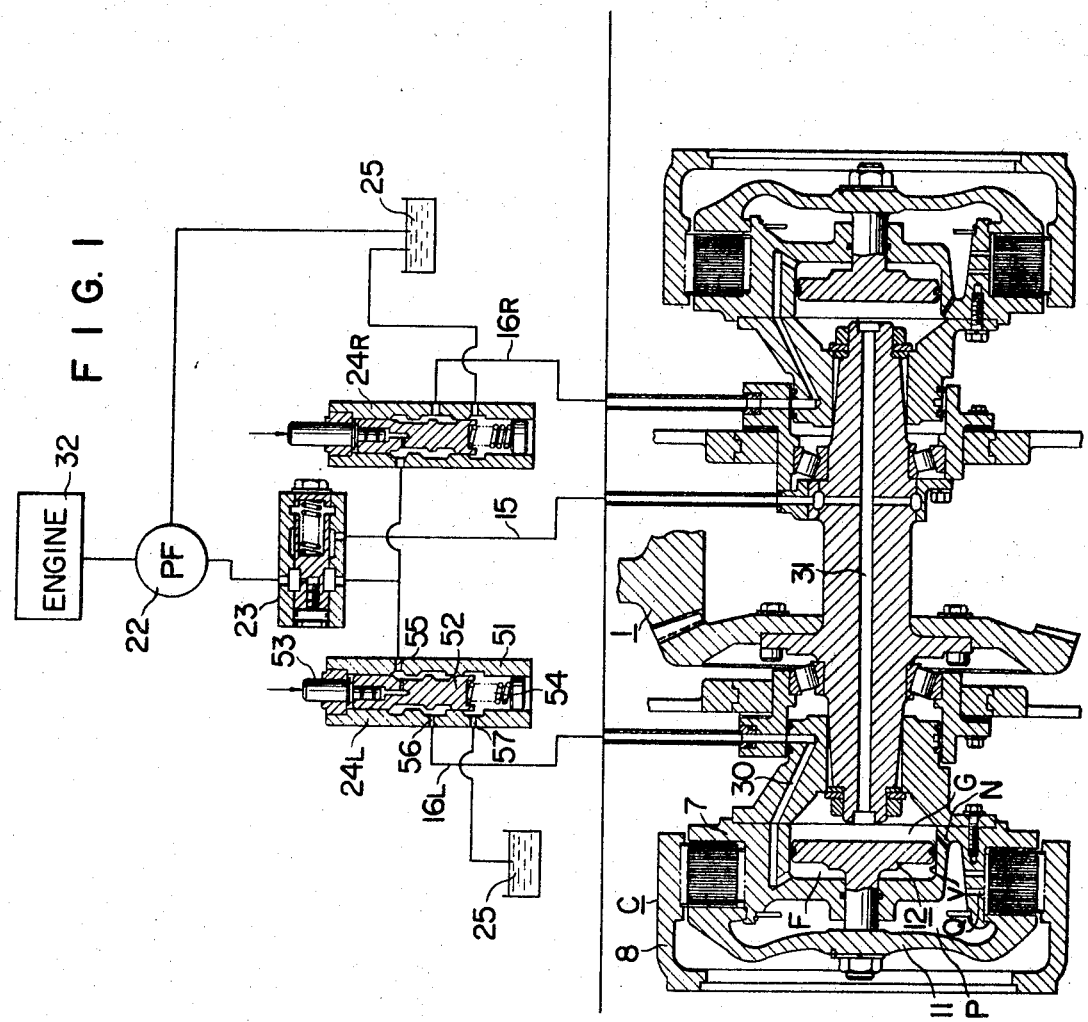

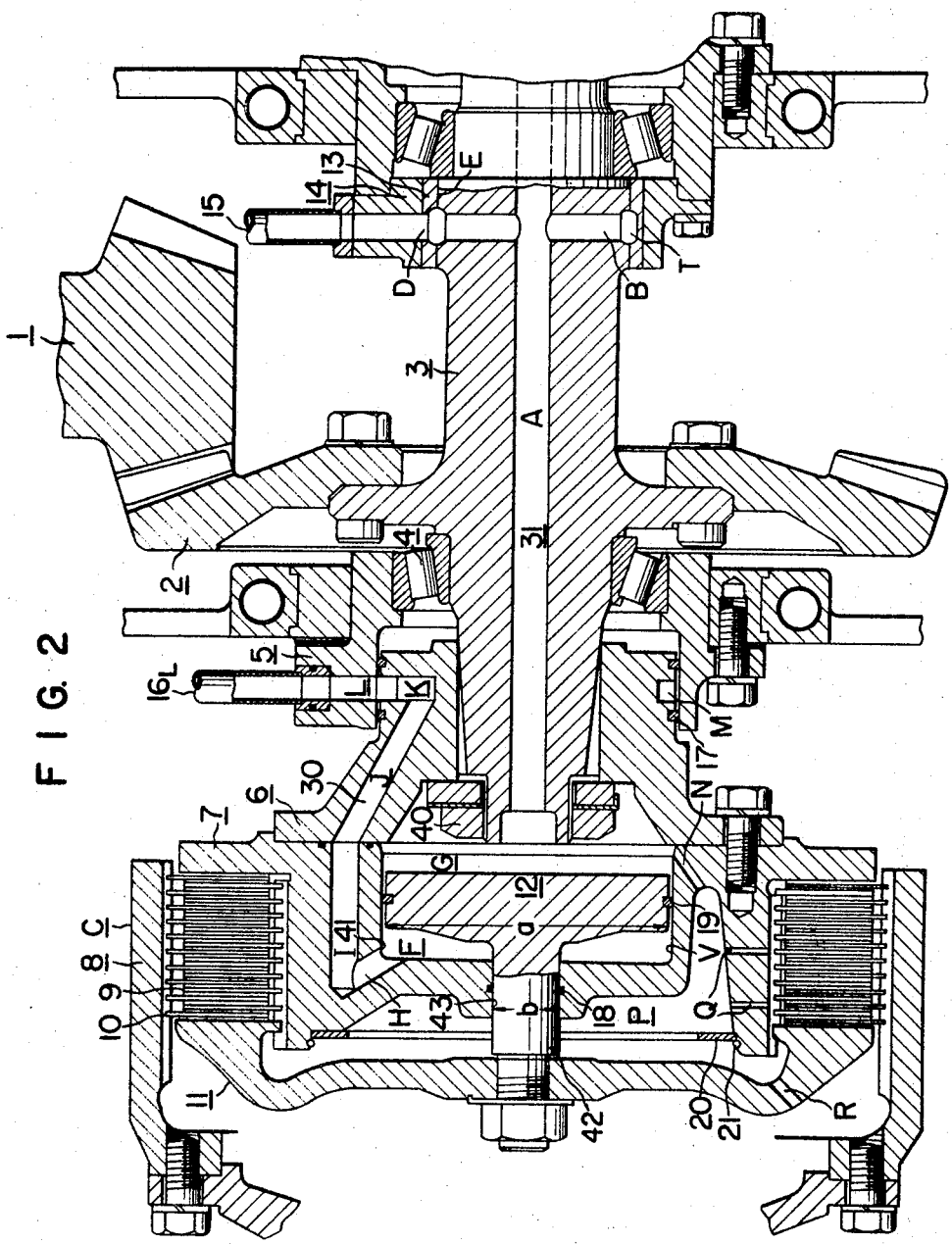

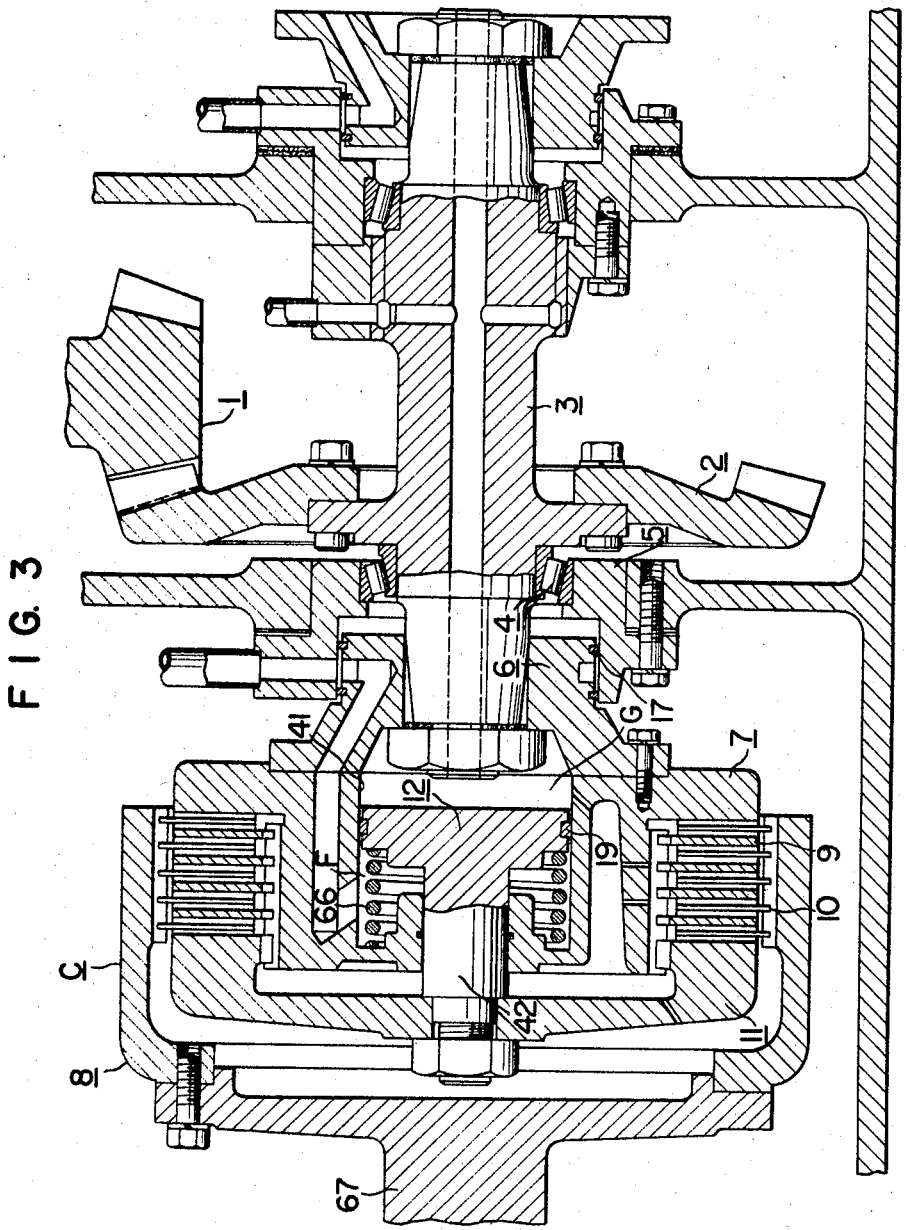

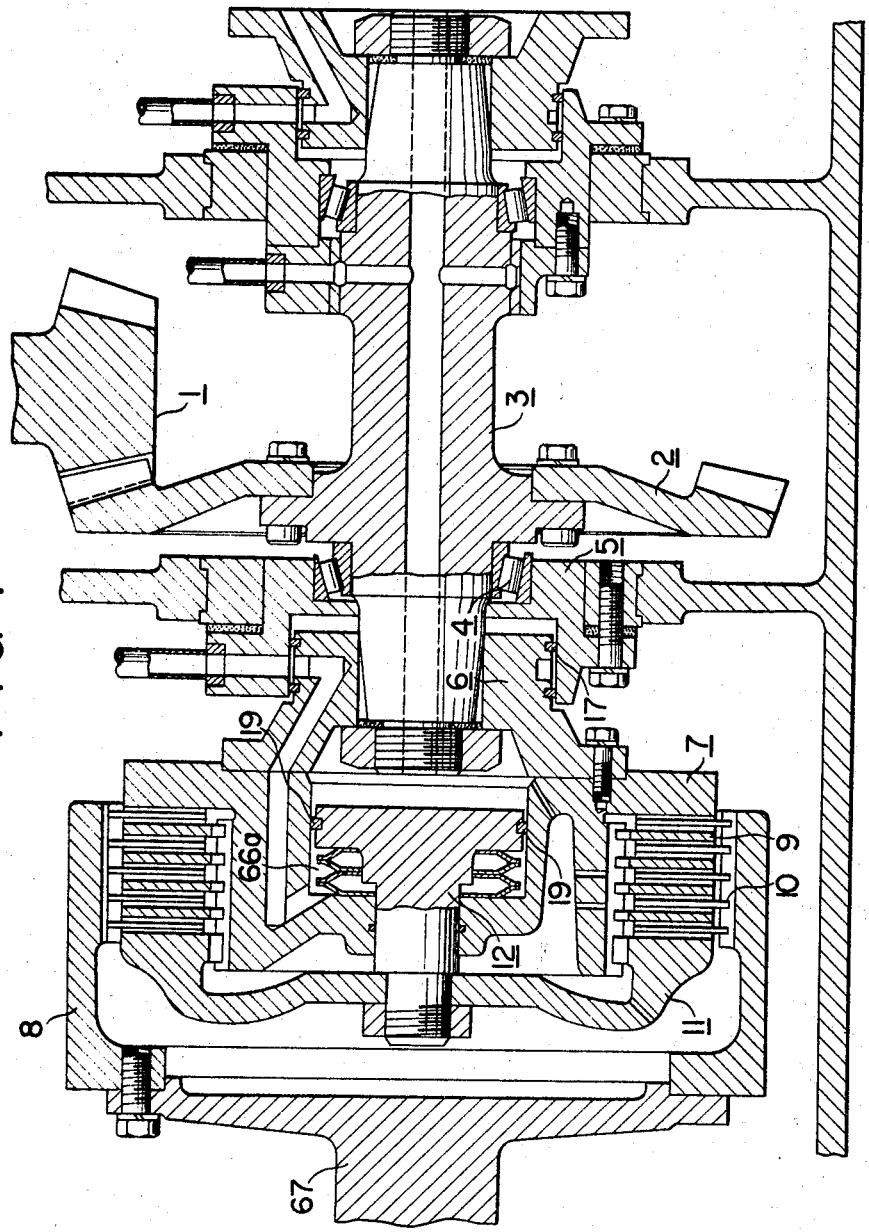

3,437,187
HYDRAULICALLY-CONTROLLED STEERING CLUTCH MECHANISM
Haruhiko Umeda, Kenji Ikemoto, and Mitsuaki Suzuki, Komatsu-shi, Japan, assignors to Kabushiki Kaisha Komatsu Seisakusho, Tokyo-to, Japan, a joint-stock company of Japan
Filed May 16, 1967, Ser. No. 638,881
Int. Cl. F16d 21/08, 25/10; B62d 5/08
U.S. Cl. 192—87.13                     5 Claims

ABSTRACT OF THE DISCLOSURE

A hydraulic system, including a double-acting hydraulic piston operating in a cylinder in the inner drum of each of two steering clutches is used to accomplish both operations of engaging and releasing the clutch. In addition an elastic device such as a conical disk spring is installed between the piston and one head of the cylinder to maintain the clutch in engaged state even when the engine is not running.

---

This invention relates to steering clutch mechanisms of track laying vehicles such as bulldozer tractors and more particularly to a new and improved hydraulically-controlled steering clutch mechanism.

In steering clutch mechanisms known heretofore for vehicles of the type referred to above, friction plates are pressed by spring force to engage by friction with clutch plates to transmit track driving torque, and, by means of lever members or hydraulic pistons operated by respective clutch pedals or clutch levers provided on the vehicle, a force counter to the spring force is exerted to reduce or remove the pressing force on the friction plates and thereby to cut off the transmission of rotational torque to the tracks.

In a certain space, however, there is a limit to the size of the springs installed therein, and an amply large pressing force cannot be obtained from such springs. Consequently, the area-pressure of the friction plates is limited to some extent, and in order to transmit high torques, it has been the practice heretofore to increase the area-pressure by expedients such as increasing the size of the friction plates (and, accordingly, of the clutch plates) and increasing the number of plates.

Such expedients lead to an increase in the size of the entire steering clutch mechanism as its torque transmitting capacity is increased. This leads further to an increase in weight and a reduction in the work performance of the vehicle. Furthermore, the fabrication process cost and starting material cost are thereby increased. Another difficulty is that the installed lengths of the springs change because of wear of the friction plates with use, whereby the pressing force due to the springs decreases, and the torque transmitting capacity of the clutch is reduced.

It is an object of the present invention to overcome the above described difficulties in steering clutch mechanisms for vehicles of the aforestated type.

More specifically, an object of the invention is to provide a hydraulically-controlled steering clutch mechanism which can be fully and easily controlled by hydraulic control, and in which the torque transmitted by each clutch can be selectively controlled.

Another object of the invention is to provide a steering clutch mechanism of the above stated character of compact size, light weight, and relatively simple construction.

Still another object of the invention is to provide a steering clutch mechanism in which the pressing force applied to the friction and clutch plates does not change even when the friction plates become worn.

A further object of the invention is to provide a hydraulically-controlled steering clutch mechanism for a vehicle, which mechanism is adapted to make possible starting of the vehicle engine by towing of the vehicle.

According to the present invention, briefly summarized, there is provided a hydraulically-controlled steering clutch mechanism of the type provided with two steering clutches each having an outer drum, supporting friction plates alternately interposed between clutch plates supported by an inner drum, and a pressure plate for pressing together and releasing the friction and clutch plates. In the steering clutch mechanism there is provided a clutch operating system comprising, in combination, a hydraulic cylinder formed coaxially in each inner drum, a double-acting hydraulic piston slidably disposed within each cylinder and having a piston rod connected at its outer end to the corresponding pressure plate, and a controllable hydraulic fluid supplying and controlling system connected to the two sides of each piston, whereby the two steering clutches can be engaged and released using only hydraulic control.

According to the present invention, there is further provided a steering clutch mechanism of the above stated character in which an elastic structure for providing plate pressing force is installed between one side of each piston and a head part of its cylinder, whereby each steering clutch is maintained in engaged state even when the engine is stopped, and starting of the engine by towing the vehicle is made possible.

The nature, principle, and details of the invention, as well as the utility thereof, will be more clearly apparent from the following detailed description with respect to a preferred embodiment of the invention when read in conjunction with the accompanying drawings, in which like parts are designated by like reference numerals and characters.

In the drawings:

FIG. 1 is a sectional plan view, partly in schematic form, indicating the relationship between a steering clutch mechanism and components of a hydraulic control system constituting an embodiment of the invention;

FIG. 2 is a relatively enlarged, sectional plan view, showing the essential parts of the steering clutch mechanism shown in FIG. 1;

FIG. 3 is a view similar to FIG. 2 illustrating the case wherein a coil spring is installed between one side of each piston and a head part of its cylinder; and FIG. 4 is also a view similar to FIG. 2 illustrating the case wherein a conical disk spring (so-called Belleville spring) is installed in place of the coil spring shown in FIG. 3.

Referring to FIGS. 1 and 2, a bevel gear 1 driven by the main engine 32 of a track laying vehicle (not shown) is meshed with a driven bevel gear 2 fixed to the clutch shaft 3 of the steering clutch mechanism, whereby the engine power is transmitted to the clutch shaft 3. The clutch shaft 3 is rotatably supported on tapered roller bearings 4 held by bearing boxes 5.

While the description set forth hereinafter, unless otherwise specified, relates to only the left-hand half of the steering clutch mechanism as illustrated in FIGS. 2, 3 and 4, it is to be understood that the right-hand half may be similarly described, being symmetrical to and constructed identically with the left-hand half.

A flanged coupling member 6 is fitted over a tapered spline onto each end of the clutch shaft 3 and is secured by a nut 40. The inner end of the coupling member 6 is disposed within a recess in the bearing box 5 with a loose fit such as to permit free rotation of the coupling member 6, rings 17 being provided therebetween to maintain oil tightness.

A clutch inner drum 7 is bolted integrally to the flange of the coupling member 6 by coupling bolts and, therefore, rotates together with the clutch shaft 3. The inner drum 7 supports a plurality of parallelly spaced apart clutch plates 9 which are splined to the outer cylindrical surface of the inner drum and are interposed alternately between friction plates 10 for engagement therewith. The friction plates 10 are splined to the inner cylindrical surface of an outer drum 8, which is coupled through a shaft 67 and other power transmitting mechanisms, such as a final drive mechanism and drive sprocket, to the left track of the vehicle (not shown).

Within the inner drum 7, there is formed concentrically therewith a hydraulic cylinder 41, within which there is provided a double-acting hydraulic piston 12 for outward and inward sliding movement (left and right sliding movement as viewed in FIGS. 1 and 2) under hydraulic pressure. The piston 12 is fixed to a piston rod 42 extending outwardly through a through hole 43 in the outer wall of the inner drum 7 and supporting at its outer end a pressure plate 11, fixed thereto by a nut, for pressing together the friction plates 10 and clutch plates 9.

The hydraulic piston 12 is provided on its radially outer cylindrical surface with a piston ring 19 fitted into a ring groove for preventing leakage of hydraulic fluid between the left and right cylinder chambers F and G on the respective opposite sides of the piston 12.

The fit between the piston rod 42 and the through hole 43 is of a looseness such as to permit free relative movement therebetween, and a ring 18 is fitted therebetween to preserve oil tightness. The inner drum 7 is provided, within its rim at its outer end, with a baffle plate 20, which is secured to the inner drum by a snap ring 21.

The clutch shaft 3 is a hollow shaft, having an axial through hole or bore A forming a hydraulic fluid passage 31 which communicates with the chamber G of the hydraulic cylinder 41. A through hole or bore B is formed in the clutch shaft 3 near the middle part thereof, in a diametrical direction, to intersect the axial through hole A, and communicates directly at its ends with an annular groove T in the inner surface of a bushing 13 in which the clutch shaft 3 is rotatably fitted. The bushing 13 is pressed-fitted into a bushing holder 14 bolted onto the right-hand gear box and having a passage D in the radial direction, the passage D communicating at its inner end with the groove T and at its outer end with a pipe line 15 from a pressure regulating valve (hereinafter referred to as a safety valve) 23 of the hydraulic control system. Thus, hydraulic pressure determined by the safety valve 23 is transmitted directly to the chamber G of the hydraulic cylinder 41. Labyrinth grooves E are provided in the clutch shaft 3 to preserve oil tightness at its part rotatably fitted into the bushing 13.

In the inner drum 7, there are provided interconnected fluid passages H and I, the passage H communicating with the side F of the hydraulic cylinder, and the passage I communicating with one end of a passage J, which is formed in the coupling 6 together with a passage K communicating with the passage J. The passage K further communicates with a passage L formed in a part of bearing box 5, the passage L being connected to a pipe line $16_L$ from a left-hand control valve $24_L$ of the hydraulic system. Thus, hydraulic pressure as determined by the control valve $24_L$ is introduced into the side F of the hydraulic cylinder 41.

The pipe lines 15 and $16_L$ are connected respectively to the safety valve 23 and control valve $24_L$ of the hydraulic system as indicated in FIG. 1. In this hydraulic system, a hydraulic pump 22 driven by the engine 32 pumps hydraulic fluid from a reservoir 25 to the safety valve 23, through which the pressurized hydraulic fluid is delivered to the control valve $24_L$ (and also to control valve $24_R$) at a pressure which is regulated at a constant value by the safety valve 23, surplus overflow hydraulic fluid being discharged through the pipe line 15.

Each control valve ($24_L$ or $24_R$) comprises, essentially, a housing 51, a valve spool 52 slidably disposed therewithin, a push rod 53 operable by a clutch pedal or lever provided on the vehicle to actuate the spool 52, and a spring 54 for exerting a force on the spool 52 toward its neutral or normal-operation position. The control valve is further provided with an inlet port 55 connected to the safety valve 23, a port 56 connected to the aforementioned pipe line 16, and an outlet port 57 connected to the reservoir 25.

The steering clutch mechanism and the hydraulic system of the above described construction and arrangement according to the invention operates in the following manner.

The hydraulic fluid flowing from the safety valve 23 to the control valve $24_L$, as mentioned briefly hereinabove, enters the control valve $24_L$ through its inlet port 55 and, in the normal operation state of the valve when there is no actuation by the clutch pedal or lever, is passed through the port 56, the pipe line 16, and passages L, K, J, I and H to reach the side F of the hydraulic cylinder 41 within the inner drum 7. (The pressure of this hydraulic fluid is always constant and is here denoted by $P_1$.)

On the other hand, the surplus overflow hydraulic fluid discharged from the safety valve 23 is sent through the pipe line 15 and, further passing through the fluid passages D, B and A, reaches the side G of the hydraulic cylinder 41 within the inner drum 7. While the pressure of this hydraulic fluid would otherwise fluctuate depending on the delivery of the hydraulic pump 22, it is maintained constant by the provision of a throttle hole N, for pressure relief in the wall of the hydraulic cylinder 41, through which hole N the hydraulic fluid is released. (This fluid pressure on the side G of the hydraulic cylinder is determined by the resistance to flow of the fluid through the throttle hole N, and, accordingly, the setting of this pressure is accomplished by selecting the configuration of the throttle hole N. This pressure is here denoted by $P_2$).

The operation of the steering clutch will first be considered for the case when this pressure $P_2$ on the side G of the hydraulic cylinder 41 of the hydraulic fluid discharged from the safety valve 23 is lower than the aforementioned pressure $P_1$ of the hydraulic fluid sent from the control valve $24_L$. That is, the relationship $P_2 < P_1$ is valid, and a force $f$ acts on the hydraulic piston 12 on the side F of the cylinder 41, whereby the piston 12 is caused to move toward the side G of the cylinder 41. This force $f$ is determined by the following equation.

$$f = \frac{\pi}{4}\{(P_1-P_2)a^2 - P_1 b^2\}$$

where $a$ is the diameter of the piston 12, and $b$ is the diameter of the piston rod 42.

The above mentioned movement of the piston 12 causes the pressure plate 11 fixed to the outer end of the piston rod 42 to move in the direction (toward the right as viewed in FIGS. 1 and 2) to press together the friction plates 10 and clutch plates 9, whereby the clutch is placed in the engaged state.

With the clutch in this state, the power from the vehicle engine is transmitted successively through the driving bevel gear 1, driven bevel gear 2, clutch shaft 3, coupling member 6, inner drum 7, clutch plates 9, friction plates 10, and outer drum 8 to drive the track (not shown), whereby the vehicle is propelled forward or rearward depending on the direction of rotation of the bevel gear 1 (it being assumed, of course, that the right-hand control valve $24_R$ is being operated to cause the right-hand clutch to operate in the same manner).

Next, the operation of the steering clutch mechanism for steering, that is, turning the vehicle (left or right), will be described. For this purpose, as is known, the steering clutch on the side toward which the vehicle is to be turned must be released so that the power from the engine will not be transmitted to the rack on that side. In this case, the clutch pedal (or lever) of the clutch to be released (here assumed to be the left-hand clutch) is operated to push downward the push rod 53 of the control valve 24$_L$ (it being herein assumed that the control valves 24$_L$ and 24$_R$ are vertically disposed).

Consequently, the spool 52 of the control valve 24$_L$ is moved in the direction to close the inlet port 55 and interconnect the ports 56 and 57, the side F of the cylinder 41 is communicated with the reservoir 25, whereby the pressure of the hydraulic fluid on the side F of the cylinder 41 is caused to equal the internal pressure of the reservoir 25. On the other hand, the flow at this time of the hydraulic fluid discharged from the safety valve 23 does not change, and, consequently, the pressure of hydraulic fluid on the side G of the cylinder 41 also does not vary.

Consequently, the pressure relationship becomes $P_1 < P_2$, and the hydraulic piston 12 is caused by the pressure difference to move toward the side F of the cylinder 41. Accordingly, the pressure plate 11 fixed to the piston rod 42 retracts in the direction to release the friction plates 10 and clutch plates 9, the frictional holding resistance between which is thereby substantially reduced, and the rotational power of the inner drum 7 is no longer transmitted to the outer drum 8, whereby the power from the engine is no longer transmitted to the left-hand track.

However, since the right-hand steering clutch is still in its engaged state, the engine is still driving the right-hand track. As a result, the vehicle turns to the side of the released clutch, i.e., to the left.

With the left-hand steering clutch in the above described state, there occurs a mutual slipping between the friction plates 10 and the clutch plates 9, which slipping gives rise to generation of frictional heat between these plates. In order to remove this heat, fluid passage holes Q are provided in the inner drum 7, as shown, to introduce a portion of the hydraulic fluid which has been discharged through the aforementioned pressure-relief throttle hole N into the spaces between the friction plates 10 and clutch plates 9 thereby to cool these plates, the fluid which has received the generated heat then being discharged toward the outer periphery of the plates. The remainder of the hydraulic fluid is discharged through a discharge hole R provided in the pressure plate 11.

In the case when the engine of the vehicle is to be started by towing, in general, the engine is placed in the compression-release state (also known as the decompression state) by manipulating the compression-release (decompression) lever, thereby to reduce the input shaft torque necessary for starting the engine, and then the engine is started by towing the vehicle and operating all power transmitting mechanisms from the tracks to the engine.

In the hydraulically controlled steering clutch mechanism as described above, however, the hydraulic pump 22 is inoperative when the engine is stopped, and the hydraulic oil is not delivered. Consequently, there is no action due to hydraulic fluid pressure within the hydraulic cylinder 41, and the friction plates 10 and clutch plates 9 assume a mutually free state, whereby the steering clutch is disengaged. (A similar state exists also in the right-hand steering clutch.)

Consequently, even though the vehicle is towed to cause the tracks to move, the resulting rotation cannot be transmitted to engine to start the engine, and the engine cannot be started by towing.

Accordingly, by installing a spring between the outer head of the hydraulic cylinder 41 and the surface of the piston 12 on the side F of the cylinder 41 as illustrated in FIG. 3, the pressure plate 11 can be caused by the pressure of the spring to press the friction plates 10 and clutch plates 9 even when the engine is stopped, thereby to maintain the steering clutch in the engaged state (on both the left-hand and right-hand sides). Accordingly, it is possible to start the engine by towing the vehicle.

Referring to FIG. 3, the details of the function of this spring are as follows. A spring 66 is installed between the hydraulic piston 12 and the outer head of the cylinder 41 of the inner drum 7. When the engine is stopped, and the pressure of the hydraulic fluid within the cylinder 41 on both sides F and G of the piston 12 becomes equal to the internal pressure of the reservoir 25, the force of the spring 66 pushes the piston 12 toward the side G of the cylinder 41, and the pressure plate 11 fixed to the outer end of the piston rod 42 moves in the direction to press together the friction plates 10 and clutch plates 9, whereby the steering clutch is engaged.

By towing the vehicle with each steering clutch in this engaged state, rotational power from the track is transmitted through the outer drum 8, friction and clutch plates 10 and 9, inner drum 7, and coupling member 6 of each clutch and hence through the clutch shaft 3, bevel gears 2 and 1, and other power transmitting parts (not shown) to the crankshaft of the engine, which can thereby be started.

In the case where a spring 66 of coil form as illustrated in FIG. 3 is used, however, when the deflection of the spring varies, the spring force also varies accordingly. Consequently, since there is a limitation to the size of the spring within a certain space, it is difficult to obtain an amply high pressing force from the spring. Since the installed length of the spring changes because of wear of the friction plates with use, the pressing force on the plates is decreased, and the torque transmitting capacity decreases. This wear becomes substantial at about the time when starting by towing is most often utilized, that is, at about the time when the operating time of the vehicle has substantially accumulated, and starting by towing becomes difficult in some cases.

This difficulty can be overcome by using, in place of the coil spring 66 as shown in FIG. 3, a conical disk spring (sometimes called a Belleville spring) 66a as illustrated in FIG. 4. Since the spring force of a conical disk spring remains almost constant with respect to variation in the deflection, the force exerted by this spring remains almost unchanged even when the friction plates become worn, and the installed length of the spring 66a changes, whereby the required torque can be transmitted even when the friction plates become worn.

Furthermore, since the installed spring force of a conical disk spring does not change appreciably, a conical disk spring with the minimum installed spring force for producing the required plate pressing force can be selected. Accordingly, the work required for clutch release can be reduced, and the power loss becomes low. A further feature of a conical disk spring is that it is capable of withstanding a great load, and the space required for its installation is extremely small in comparison with those of other springs. Therefore, the entire clutch mechanism can be made small, compact, and light with substantial advantage in performance and cost.

After the above described starting of the engine, the clutch mechanism is operated hydraulically in the same manner as in the clutch mechanism illustrated in FIGS. 1 and 2.

Thus, by the use of the steering clutch mechanism of the above described construction and arrangement according to the present invention, the quantity of torque transmitted by each clutch can be freely and smoothly selected by controlling the hydraulic fluid pressure which is applied to the hydraulic cylinder. Accordingly, in comparison with conventional steering clutch mechanisms depending on springs, the dimensions and number of the friction plates and clutch plates can be reduced.

Furthermore, since a hydraulic piston or push arm member for clutch release as used heretofore is unnecessary, the construction becomes simple, and the steering clutch mechanism, itself, can be further made compact and light in weight, whereby the vehicle performance can be improved, and the production costs of the vehicle can be lowered. Moreover, since the steering clutch mechanism is made compact and light, its installation in and removal from the vehicle is simplified and facilitated.

A further advantageous feature of the steering clutch mechanism of the invention is that, since springs are not used for pressing together the friction and clutch plates in the conventional manner, the pressing force on the plates does not change even when the friction plates become worn, and the transmitted torque can be maintained substantially constant. Still another advantage is that all steering operations of the vehicle can be accomplished by only hydraulic control valve actuations, whereby the steering is facilitated and made smooth. Furthermore, when the engine is to be started by towing the vehicle, the steering clutch mechanism of the invention can be effectively utilized.

What we claim is:

1. In a hydraulically controlled steering clutch mechanism including two multiple plate steering clutches controlling transmission of power from the engine of a vehicle to the traction components of the vehicle, the improvement comprising, in combination, a hydraulic pump driven by said engine; a fluid reservoir connected to the inlet of said pump; a pressure regulating safety valve connected to the outlet of said pump and having first and second outlets; a rotatably mounted clutch shaft; driving means interconnecting said engine and said shaft; each clutch including a driving member, secured to rotate with said clutch shaft, and a driven member; each driven member being coupled to rotate with the associated driving member when the clutch plates are pressed into engagement; a respective hydraulic cylinder formed in each clutch driven member coaxially therewith; a respective double acting piston reciprocable in each cylinder and dividing the latter into inner and outer chambers; a respective pressure plate connected to each piston and operable to press the associated clutch plates into engagement; a pair of control valves each associated with a respective clutch, each control valve having an inlet connected to the first outlet of said pressure regulating valve, a first outlet connected to the outer chamber of the associated cylinder, and a second outlet connected to said reservoir; each control valve having a normal position interconnecting its inlet and its first outlet and blocking its second outlet, to supply fluid under pressure to its associated outer chamber, and an operated position interconnecting its first and second outlets and blocking its inlet, to connect its associated outer chamber to said reservoir; means commonly connecting said second outlet of said pressure regulating valve to said inner chambers; and means forming a respective throttling outlet passage for each inner chamber therein and controlling the fluid pressure in each inner chamber, when the associated control valve is in its normal position, to a constant value less than the fluid pressure in the associated outer chamber, whereby the associated piston is displaced in a direction to press the connected pressure plate against the clutch plates of the associated clutch to couple the driving valve to the operated position resulting in reduction to substantially zero of the pressure in the associated outer chamber, to disengage the associated clutch by movement of the associated piston by the constant fluid pressure in the associated outer chamber.

2. In a hydraulically controlled steering clutch mechanism, the improvement claims in claim 1, in which said pressure regulating valve regulates the pressure of the fluid delivered to said control valves with overflow fluid being discharged through said second outlet of said pressure regulating valve; said driving means comprising bevel gearing including a bevel gear secured to rotate with said clutch shaft; said clutch shaft being formed with an axial bore therethrough opening at opposite ends into the respective inner chambers; said clutch shaft being formed with a diametric bore intersecting said axial bore; the means rotatably mounting said clutch shaft being formed with an annular groove communicating with said diametric bore; the driving member of each clutch including a flange coupling member secured on the associated end of said clutch shaft, and said flange coupling members being formed with fluid passages communicating with the respective outer chambers; each clutch driving member comprising an inner drum integral with the associated flange coupling member; each clutch driven member comprising an outer drum surrounding the associated inner drum; each inner drum being formed with fluid flow passage communicating with the fluid passages formed in the associated flange coupling member; and conduits connecting said annular groove with said second outlet of said pressure regulating valve and said fluid passages in said inner drums with said first outlets of the associated control valves.

3. In a hydraulically controlled steering clutch mechanism, the improvement claimed in claim 2, in which said inner drums are formed with a plurality of apertures opening therethrough for flow of a portion of said hydraulic fluid between the associated clutch plates to cool the associated clutch plates relative to heat developed by friction therebetween.

4. In a hydraulically controlled steering clutch mechanism, the improvement claimed in claim 1, including a respective spring disposed in each outer chamber and engaged between the associated piston and the adjacent end wall of the associated hydraulic cylinder, whereby said pistons are biased by said springs in a direction to maintain the associated clutches engaged in the absence of hydraulic pressure, to enable said engine to be started by towing of said vehicle.

5. In a hydraulically controlled steering clutch mechanism, the improvement claimed in claim 4, in which said spring is a conical disk spring.

References Cited

UNITED STATES PATENTS

| | | | |
|---|---|---|---|
| 2,226,801 | 12/1940 | Black | 192—85 X |
| 2,614,396 | 10/1952 | Ratermann | 192—85 X |
| 2,883,026 | 4/1959 | Banker | 192—85 |
| 2,898,774 | 8/1959 | Lammerz | 192—86 X |
| 3,016,121 | 1/1962 | Mosbacher | 192—85 X |
| 3,042,167 | 7/1962 | Petrie et al. | 192—86 |

FOREIGN PATENTS

| | | |
|---|---|---|
| 975,930 | 3/1951 | France. |
| 847,559 | 7/1960 | Great Britain. |

OTHER REFERENCES

German Printed Application DAS 1,100,481, February 1961, Klave, 180–6.7.

KENNETH H. BETTS, *Primary Examiner.*

J. A. PEKAR, *Assistant Examiner.*

U.S. Cl. X.R.

192—49